United States Patent
Kalayjian

(10) Patent No.: US 7,827,344 B2
(45) Date of Patent: *Nov. 2, 2010

(54) INTERFACE ADAPTER FOR A PORTABLE MEDIA PLAYER DEVICE

(75) Inventor: Nicholas Kalayjian, San Carlos, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/477,730

(22) Filed: Jun. 3, 2009

(65) Prior Publication Data

US 2009/0240864 A1 Sep. 24, 2009

Related U.S. Application Data

(63) Continuation of application No. 11/495,192, filed on Jul. 28, 2006, now Pat. No. 7,549,008.

(60) Provisional application No. 60/706,142, filed on Aug. 5, 2005.

(51) Int. Cl.
*G06F 13/20* (2006.01)
(52) U.S. Cl. .................. 710/313; 710/305; 710/306; 710/100
(58) Field of Classification Search ............... 710/313, 710/305–306, 100
See application file for complete search history.

(56) References Cited

U.S. PATENT DOCUMENTS 6,801,968 B2 * 10/2004 Hunter ..................... 710/65

\* cited by examiner

*Primary Examiner*—Thomas J Cleary
*Assistant Examiner*—Kim T Huynh
(74) *Attorney, Agent, or Firm*—Greenberg Traurig, LLP

(57) ABSTRACT

A "smart cable" that connects one or more peripheral devices to a digital media player having multiple, different types of input and/or output connections.

6 Claims, 3 Drawing Sheets

INTERFACE ADAPTER FOR A PORTABLE MEDIA PLAYER DEVICE

RELATED APPLICATION

This application is a continuation of and claims the benefit of U.S. application Ser. No. 11/495,192, filed Jul. 28, 2006, which, in turn, claims the benefit of U.S. Provisional Application No. 60/706,142, filed Aug. 5, 2005, both of which are incorporated herein by reference in their entirety.

BACKGROUND

In the art, interface adapters are known. For example, U.S. Pat. No. 4,124,889 illustrates and describes a distributed input/output system for controlling numerous peripheral devices and for transferring data signals and control signals between the peripheral devices and a general purpose digital computer. The control system described includes a multiplexer which can accommodate as many as eight input/output devices under the control of separate programmable microcoded peripheral-unit controllers. Each controller is adapted to be located at or on an individual peripheral device and each is connected to the multiplexer by an identical ribbon cable that is employed to carry both signals and power. Each controller employs a substantially identical microengine, that is, a microcoded processor. The peripheral-unit controllers may be configured somewhat differently depending upon whether the peripheral device utilizes data signals in parallel or in series. Data may be transferred directly between a computer memory unit and the peripheral devices without requiring the use of any computer working registers and without requiring subroutines to preserve an ongoing main program. Each peripheral-device controller can issue interrupt signals which are processed by the computer on a priority basis when they occur simultaneously. Some microengines employ two sets of programmed microcodes and each set is selectable by a switch, such as a wire jumper, for controlling either of two different kinds of devices.

Also known in the art are a number of audio/serial interface cables for connecting a digital media player, such as an iPod® to another device. Most of the cables are used in connection with automotive applications. For example, Mercedes, BMW, Audi, VW and Porsche all sell aftermarket cables to allow an iPod® to be integrated into their cars using an analog/serial cable. Dension and Monster Cable also sell aftermarket kits for integration with many vehicle head units. Clarion and Kenwood both sell aftermarket car audio systems that include analog/serial interface to an iPod®. None of these solutions, however, are USB or digital and thus they are all single mode and cannot be used to transfer digital content to the iPod®.

Accordingly, a need exists for an improved cable adaptor, for example, one which can be used to both transfer data to or from an iPod®, in file form, as well as to control analog audio playback over a serial port.

SUMMARY

The following describes a "smart cable" that can connect one or more peripheral devices to a digital media player having multiple, different types of input and/or output connections. By way of example, in the case of the iPod® there are three connection options, USB device, serial port, and analog audio and the iPod® can operate in two modes, either as a USB mass storage device, or as a serially controlled analog audio source.

DETAILED DESCRIPTION

The iPod®, and potentially other media players, have usage limitations that are driven by the Digital Rights Management (DRM) licenses of online music services or content providers. In the case of iPod®, Apple does not allow the music transferred to an iPod® to be played in a digital form on any device other than the specific iPod® it was transferred to from iTunes®. To allow iPods to operate with other systems such as cars or home stereos, Apple defines a serial protocol for controlling the analog audio playback from the device.

In some cases such as data synchronization from non-iTunes® servers, a system such as a car multimedia controller might want to connect to the iPod® over a digital USB connection.

The invention thus provides a cable that uses the USB protocol to either connect the host multimedia system to the iPod® over an analog and serial interface, or over a digital interface, depending on the specific use required. USB is the common interface, and analog and serial signals are converted to USB to allow a single connection to the host multimedia system.

To this end, FIG. 1 is a design that uses standard, discrete components. The design starts with a USB hub that converts a single host port on the multimedia playback system into multiple ports. In digital USB transfer mode, the host directs the USB hub to enable the USB connection directly to the iPod® and disable the connection to the USB audio and USB serial converters. Data can then be transferred in a file based USB mass storage model between the iPod® and the host. In analog/serial mode, the host commands the hub to disable the direct USB connection to the iPod® and instead enable the USB serial and USB audio converters. The iPod® can then be controlled over the serial interface and analog audio is digitized by the analog to digital converter "ADC" and sent to the host.

Figure 1:
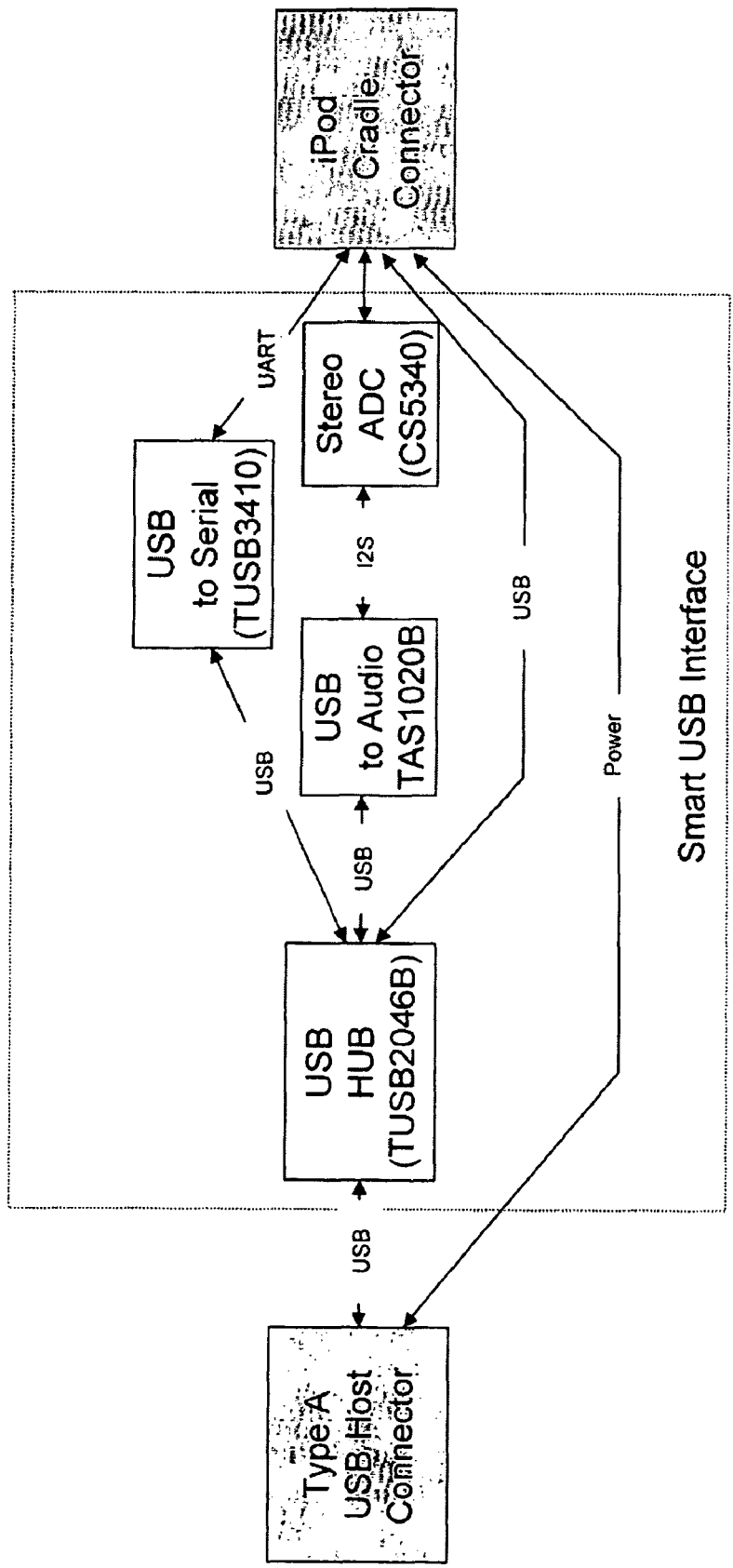
Figure 2:
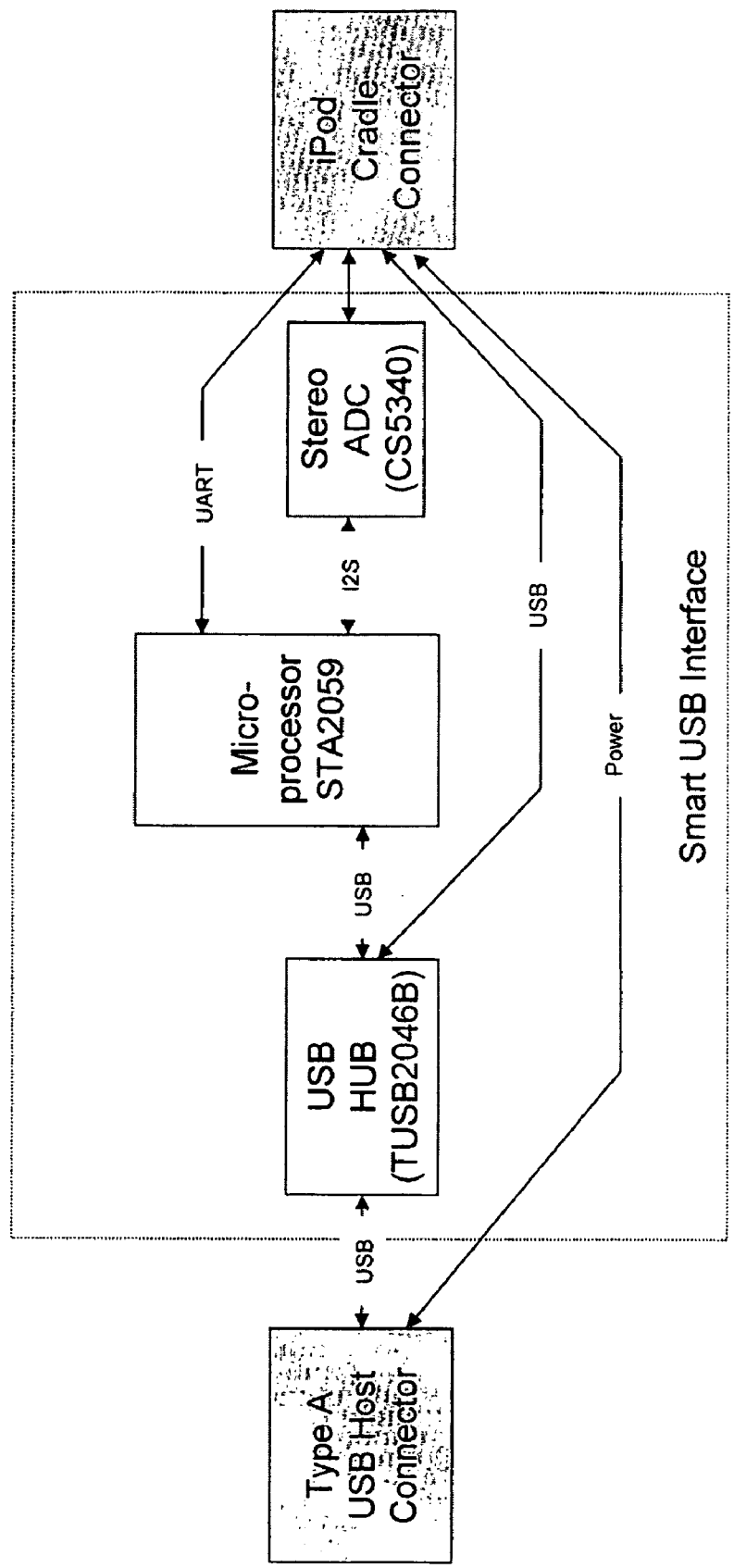
FIG. 2 is a refinement of the embodiment illustrated in FIG. 1 and uses a microprocessor to combine the functions of the USB audio and serial converters. The host either enables the direct USB connection to the iPod®, or it enables the microprocessor USB port to enable the audio and serial interface.
Figure 3:
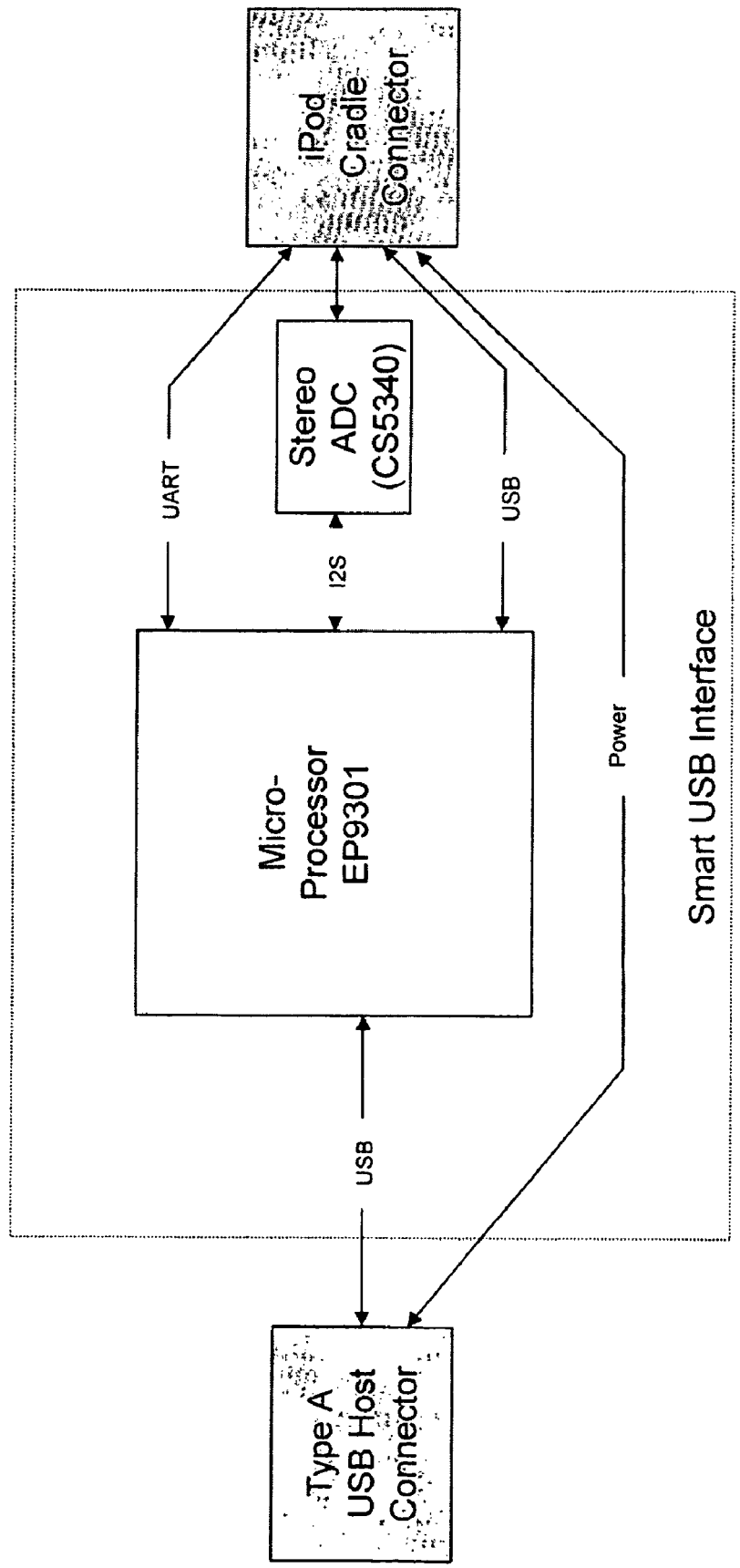
FIG. 3 is a still further refinement that uses a microprocessor to combine the functions of the USB hub, USB audio converter, and the USB serial converter. The host sends commands to the microprocessor to enable either the USB or the analog audio/serial interface.

The design shown in FIG. 1 could be assembled from off-the-shelf parts by any person familiar with the iPod® protocol and USB protocols. The designs of FIGS. 2 and 3 are more refined and, while requiring more engineering and firmware, are well within the capabilities of those skilled in the art. The designs of FIGS. 2 and 3 will additionally result in a reduction in product cost.

Although the Apple iPod® was used by way of example in the exemplary descriptions, it will be understood that the principles described herein are broadly applicable to portable media player devices in general. For example, the different types of ports of the portable media device may be a USB port and an analog port; a serial port and an analog port; etc. without limitation.

What is claimed is:

1. A device for connecting a media playback device having a plurality of ports and a host device having a single port, comprising:

an interface adapter having a first connector and a second connector for respectively placing each of the plurality of ports of the media playback device into communication with the single port of the host device;

wherein the interface adapter functions to facilitate communications between the host device and the media playback device via the single port of the host device and each of the plurality of ports of the media playback device by converting first signals received from the host device via the single port of the host device to communications having a format appropriate for provision to the media playback device via a first one of the plurality of ports of the media playback device to thereby allow for control of the media playback device and by converting second signals received from the media playback device via a second one of the plurality of ports of the media playback device to communications having a format appropriate for provision to the host device via the single port of the host device to thereby allow for transfer of digital media stored on the media playback device to the host device.

2. A device for connecting a media playback device having a plurality of ports with a host device having a single port, comprising:

an interface adapter having a first connector and a second connector for respectively placing each of the plurality of ports of the media playback device into communication with the single port of the host device;

wherein the interface adapter functions in a first mode to facilitate communications between the host device and the media playback device via the single port of the host device and a first one of the plurality of ports of the media playback device; and wherein the interface adapter functions in a second mode to facilitate communications between the host device and the media playback device via the single port of the host device and a second one of the plurality of ports of the media playback device by converting signals received from the media playback device via the second one of the plurality of ports of the media playback device to communications having a format appropriate for provision to the host device via the single port of the host device to thereby allow for transfer of digital media stored on the media playback device to the host device.

3. The device according to claim 2, wherein the host device renders content of the digital media transferred by the media playback device.

4. The device according to claim 2, wherein the host device stores the digital media transferred by the media playback device.

5. The device according to claim 1, wherein the host device renders content of the digital media transferred by the media playback device.

6. The device according to claim 1, wherein the host device stores the digital media transferred by the media playback device.

* * * * *